United States Patent
Radermacher et al.

[11] Patent Number: 5,974,836
[45] Date of Patent: Nov. 2, 1999

[54] DEVICE USED FOR THE BENDING OF PLATE GLASS INTO CONVEX SHAPES

[75] Inventors: Herbert Radermacher, Raeren, Belgium; Karl-Josef Ollfisch, Kerkrade, Netherlands; Werner Diederen, Herzogenrath; Knut Dahlhoff, Aachen, both of Germany

[73] Assignee: Saint-Gobain Vitrage, Courbevoie, France

[21] Appl. No.: 09/097,263

[22] Filed: Jun. 15, 1998

[30] Foreign Application Priority Data

Jun. 14, 1997 [DE] Germany ............................ 197 25 189

[51] Int. Cl.⁶ .................................................. C03B 23/03
[52] U.S. Cl. ................................ 65/273; 65/275; 65/286; 65/290; 65/291; 65/361
[58] Field of Search .................................... 65/157, 182.2, 65/268, 273, 275, 287, 289, 290, 291, 357, 359, 360, 361

[56] References Cited

U.S. PATENT DOCUMENTS

| | | |
|---|---|---|
| 2,827,738 | 3/1958 | McKelvey . |
| 2,977,719 | 4/1961 | Devore . |
| 3,265,489 | 8/1966 | Garbin . |
| 3,880,636 | 4/1975 | Tobin et al. . |
| 4,470,837 | 9/1984 | Seymour . |
| 4,661,141 | 4/1987 | Nitschke et al. . |
| 4,865,638 | 9/1989 | Kudo . |
| 4,915,722 | 4/1990 | Havenith et al. . |
| 5,178,660 | 1/1993 | Wampler et al. . |
| 5,302,176 | 4/1994 | Shibuya et al. . |
| 5,352,263 | 10/1994 | Kuster et al. . |

*Primary Examiner*—Steven P. Griffin
*Attorney, Agent, or Firm*—Oblon, Spivak, McClelland, Maier & Neustadt, P.C.

[57] ABSTRACT

A device used for the bending of plate glass sections (3) includes an oven (1), a bending chamber (6), an upper bending mold installed in the bending chamber (6) in such a manner as to be able to be raised and lowered, a duct producing a flow of hot gas in order to raise the plate glass sections (3) against the upper bending mold, a lower bending mold in the form of a frame that works together with the upper bending mold to ensure bending by compression of the plate glass that is held by the flow of hot gas against the upper bending mold, as well as a movable transport frame (20) which is used to pick up the bent plate glass from the upper bending mold and to transport it to a cooling station located downstream. The lower bending mold in the shape of a frame is comprised of individual frame segments (9, 10, 11, 12) which can be moved between a closed position defining said lower bending frame and an open position in which the segments are separated from one another by such a distance that the upper bending mold can pass through the space defined within the separated segments.

12 Claims, 6 Drawing Sheets

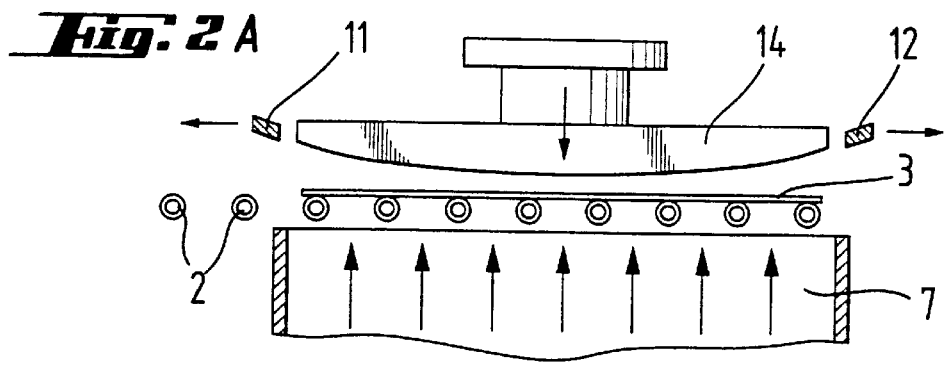
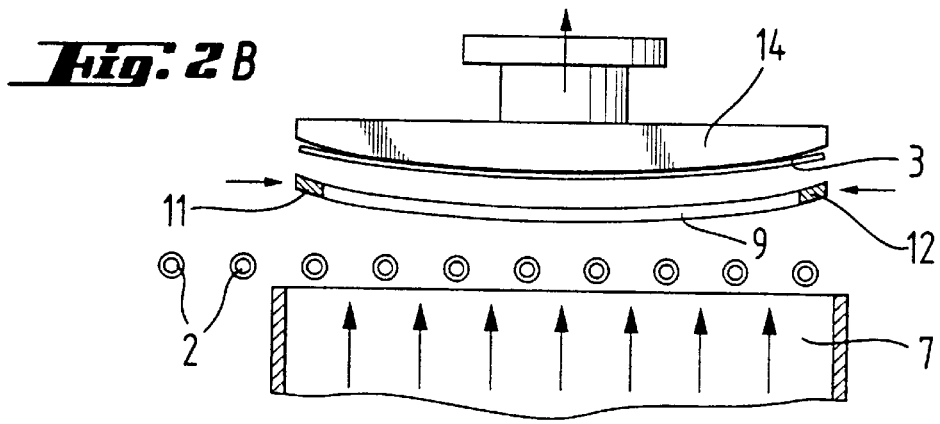
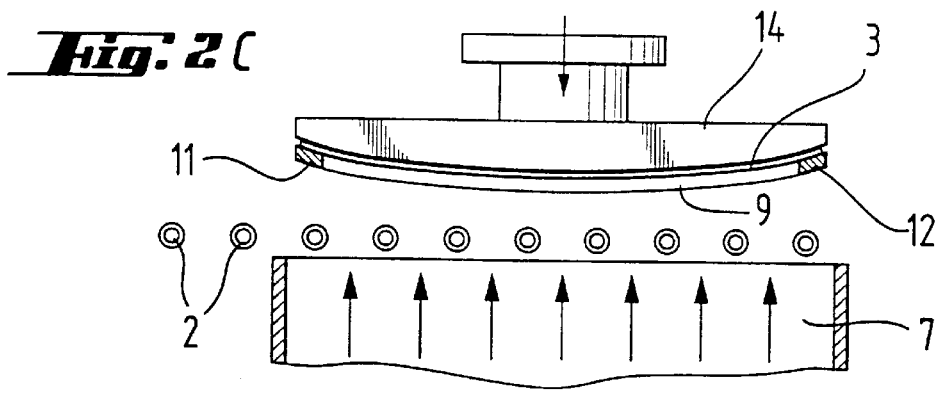
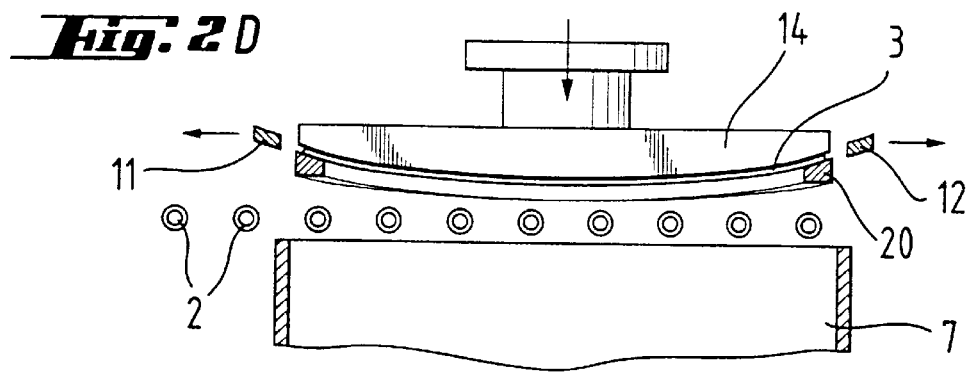

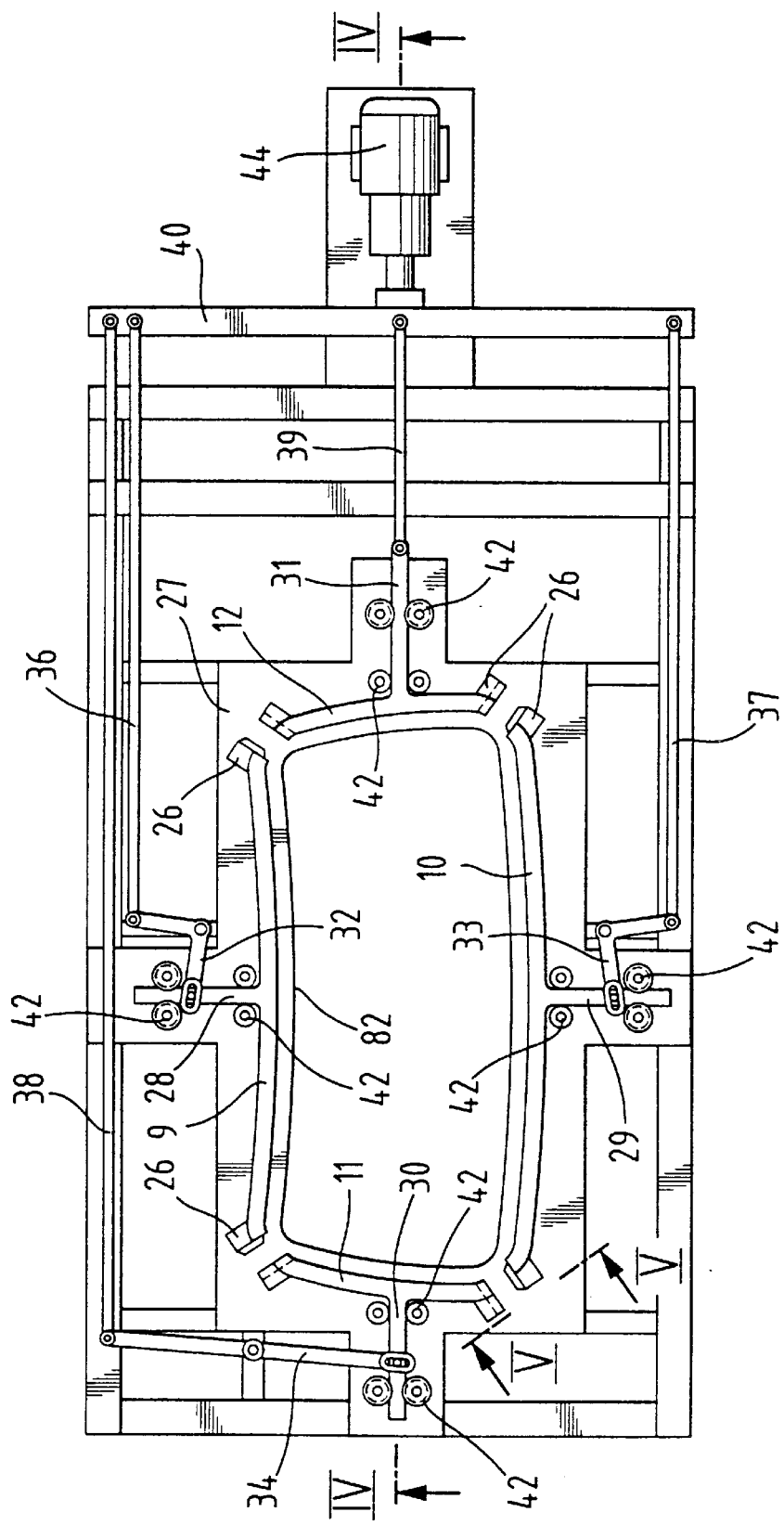

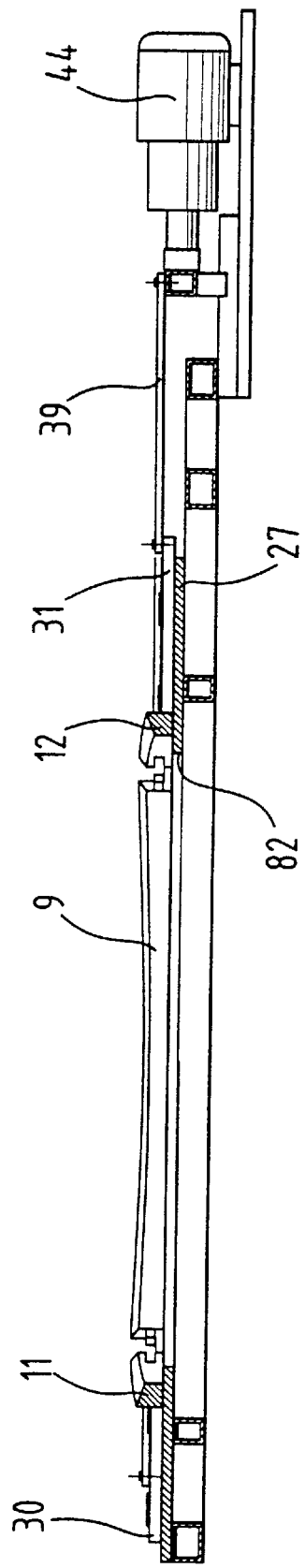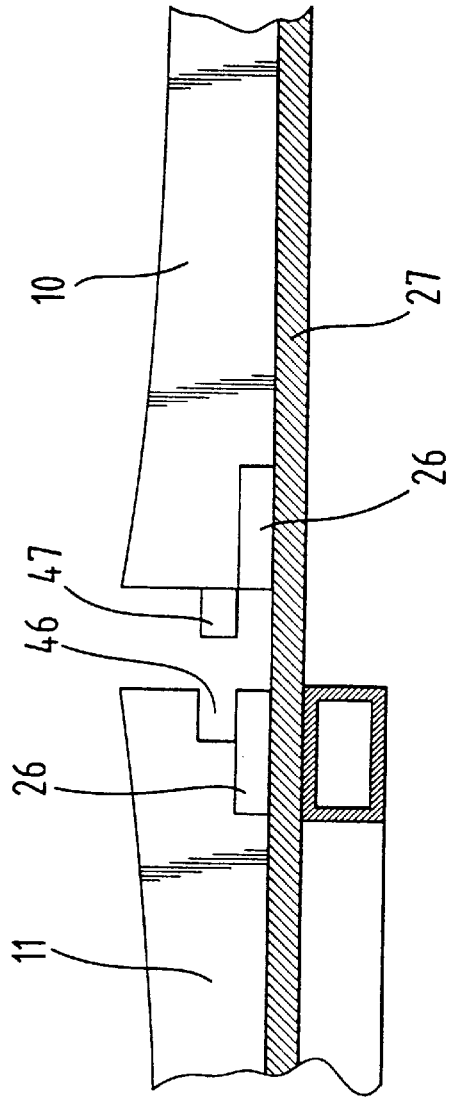

DEVICE USED FOR THE BENDING OF PLATE GLASS INTO CONVEX SHAPES

BACKGROUND OF THE INVENTION

1. Field of the Invention

This invention generally relates to a device used for the bending of plate glass. More particularly, it relates to a bending chamber an upper bending mold and a lower bending frame which work together to bend a plate glass section.

2. Description of the Related Art

A bending device of this kind is known from the document EP-0,237,231 B1. There, the lower bending mold above the transport plane of the plate glass sections, which plane is a rolling conveyor, is able to move horizontally from an initial position alongside the upper bending mold toward a second position below the upper bending mold which holds the plate glass section. Following the bending operation by compression, during which the upper bending mold is lowered with the plate glass section onto the lower bending section and then is raised to its starting position, the lower bending mold is displaced laterally outside the bending chamber and remains, until the following operation of bending by compression, in a waiting position in a heated chamber. The lower compression bending mold is therefore not subjected to cooling after each bending operation, as is the case for other known bending devices in which the bending mold is used subsequently for transport of the bent plate glass section to the cooling station and is there cooled with the plate glass section. By using a molding frame exclusively as the bending mold and a transport frame exclusively for the transport of the bent plate glass sections, one can continuously maintain the molding frame at a relatively high temperature, which considerably facilitates the bending operation, in particular with complex-shaped plate glass section molds.

Since, in the case of the known device, it is necessary to provide a closed heated chamber alongside the bending station to receive the lower bending mold in its waiting position, the chamber which houses the bending station is only accessible on one side. This complicates monitoring of the bending process, as well as the possibilities of operation during a required tool change and during other interventions which are required in the bending process. In addition, the lower bending mold must be displaced horizontally over a relatively long distance before and after the compression bending operation, a requirement which lengthens the bending cycle overall.

SUMMARY OF THE INVENTION

It is an object of the invention to provide a bending device having a more rapid bending cycle.

It is a further object of the invention to provide a bending device in which access to the bending chamber is facilitated.

In accordance with the invention, the above and other objects are advanced by use of a lower bending frame comprised of at least two bending frame segments displaceable between a closed position defining the lower bending frame and an open position wherein the at least two segments are separated from one another by such a distance that the upper bending mold can pass through the space defined within the separated segments.

When the lower bending frame is used for bending an essentially quadrangular glass section, it is advantageously separated at its four corners into four bending frame segments. The different bending frame segments can, for example, be installed on sliding bearings and can be individually powered, or powered by a common servomotor through the intermediary of a suitable lever mechanism. The distance covered by the individual segments in one direction or the other can be relatively short and can, for example, be equal to only a few centimeters.

The lower bending frame can also be built in such a way that the individual bending frame segments are able to pivot around a horizontal axis directed parallel to the main direction of the respective segment, and are provided with a pivoting control mechanism.

BRIEF DESCRIPTION OF THE DRAWINGS

Other particular features and advantages of the invention will be apparent from the claims in the following description of the forms of preferred implementation of the invention with reference to the drawings in which:

FIGS. 2A–2D show the different phases of the bending cycle with the corresponding positions of the bending molds;

FIG. 3 illustrates construction of the lower bending mold segmented with horizontal displacement of the bending mold segments;

FIG. 4 is a sectional view along line IV—IV of FIG. 3;

FIG. 5 is a sectional view along line V—V of FIG. 3, on a larger scale;

DETAILED DESCRIPTION OF THE PREFERRED EMBODIMENTS

Figure 1:
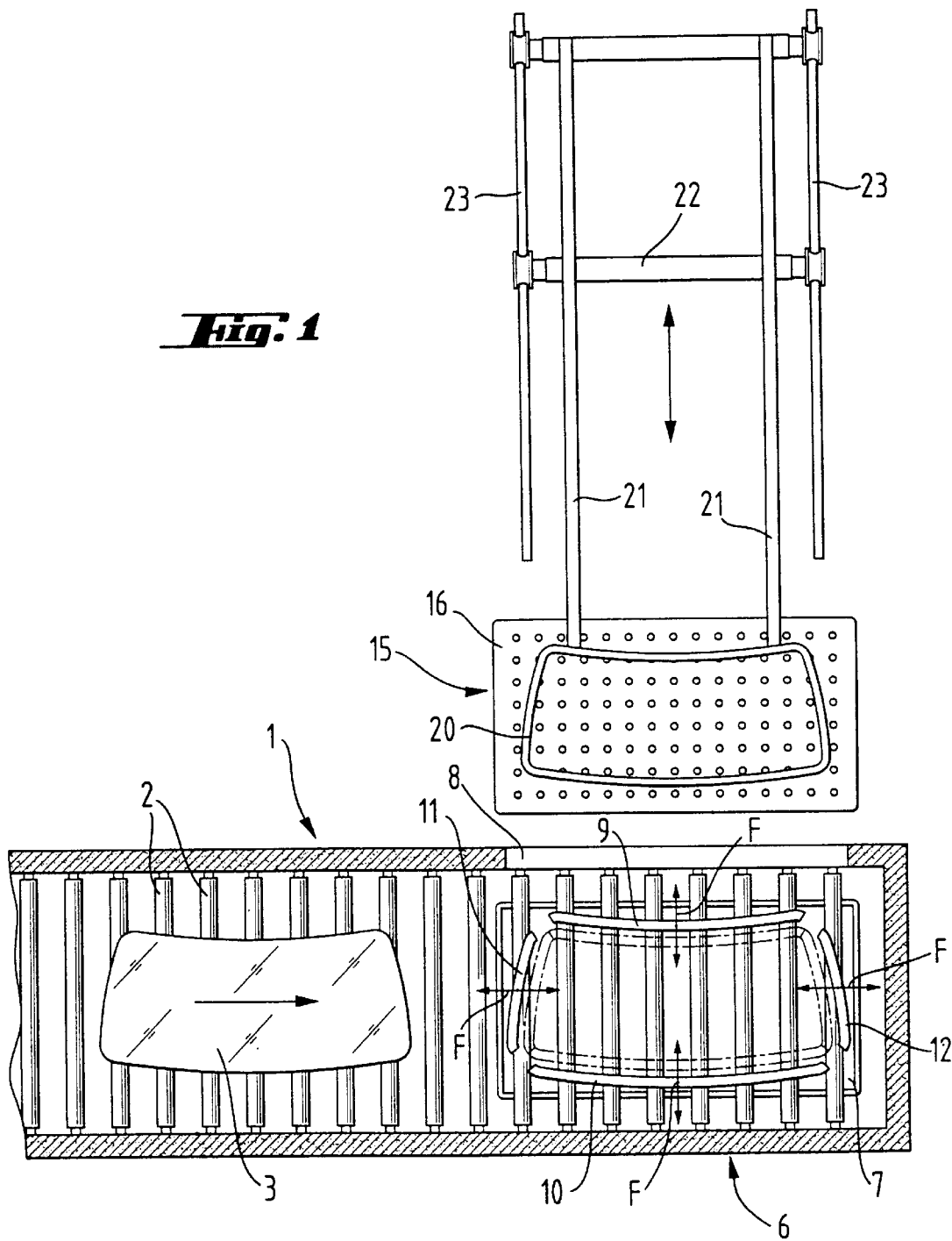
FIG. 1 is a schematic top plan view, partly in section, of a bending and tempering unit according to the invention.

The basic structure of the device in accordance with the invention is shown in FIG. 1, which shows the tempering of automobile windows. The unit includes a horizontal continuous oven 1 having a horizontal conveyor for the windows 3, comprised of continuously driven transport rollers 2. The bending chamber 6 is contiguous with oven 1. The roller conveyor 2 extends into the bending chamber 6. Below the transport rollers 2 there is provided a vertical channel 7 whose transverse section corresponds to the length of the windows 3, and by which a flow of hot air heated to about 650° C. is delivered from below against the window when the latter is positioned in the bending chamber 6. This flow of gas comprises means for generating a differential gas pressure which can raise the window sections 3 from the conveyor rollers 2 and bring them against the upper bending mold.

The means for generating the required differential gas pressure could instead be comprised by a suction cup device which contains the upper bending mold or by individual flows of gas under pressure that are directed from the bottom toward the window sections.

Above the transport rollers 2 is arranged in the bending chamber, a bending mold 14 (FIGS. 2A–2D) having a downwardly directed convex side, which can be moved in the vertical direction. In addition, four bending frame segments 9, 10, 11 and 12 which are concentric with the upper bending mold are arranged above the transport rollers 2 in such a manner that they can be opened or closed by respective horizontal sliding in the direction of the double arrow F. In the closed position, segments 9 to 12 comprise a lower bending mold in the form of a frame. In the open position, segments 9 to 12 are separated from one another to the extent that window sections 3 as well as the upper bending mold 14 can pass through the space defined by the bending frame segments.

At the side of the bending chamber 6 is located a tempering station 15 where the bent window sections are cooled quickly by means of gas blowing tank 16. However there might be provided, in the place of the tempering station 15, a cooling station in which the bent window sections are cooled in such a manner as to reach partial tempering or a state without stresses due to appropriate cooling speed that is slower in the area of the critical temperature.

Following a bending operation, the window sections are separated from the upper bending mold by a transport frame 20 which corresponds to the contour of the bent window section, and are transferred, through opening 8 of the bending chamber 6, to the tempering station 15. The transport frame 20 is mounted through the intermediary of suitable supporting bars 21 on a cart 22 which is displaceable on rails 23. The cooled window sections at the tempering station 15 are then led by the transport device 20-23 from the tempering station 15 to a following unloading station in which the tempered window sections are removed from the transport frame 20.

FIGS. 2A–2D are schematic vertical sectional views of the different successive process stages in the bending operation. FIG. 2A shows the position of the bending tools at the moment when the window section 3 in the bending chamber has reached its final position, and in which it must be raised from the transport rollers 2 by the hot air flow flowing through channel 7, and brought against the convex bending surface of the upper bending mold 14. The upper bending mold 14 is in this case in a lowered position slightly above the window section which rests on the transport rollers 2. The bending frame segments 11, 12 occupy their open position so that the upper bending mold 14 can pass between them.

When the window section 3 is applied, due to the hot gas flow, against the bending mold 14, the bending mold 14 is raised to a level above the bending frame segments 11 and 12. This is shown in FIG. 2B. The upper bending mold 14 has there reached its upper final position, and window section 3 is held by the flow of ascending hot gas against the convex bending surface of the bending mold 14. It is thereby applied to a large extent against the bending surface, but must also be pressed at its marginal area by bending frame 9–12. For this purpose, the different segments 9–12 are located next to one another so that they comprise the closed bending frame. Then, as shown in FIG. 2C, while maintaining the hot flow of gas, the bending mold 14 is lowered with the window section 3, and the latter is pressed against the closed bending frame 9–12.

Immediately following the pressing step using the bending frame 9–12, the transport frame 20 is brought below the upper bending mold 14 and the bending frame segments 9–12 are separated from one another. Next, as shown in FIG. 2D, the bending mold 14 and the completely bent window section 3 are lowered past the open bending frame segments.

Alternatively, the bending mold 14 is again raised and the transport frame 20 is introduced into the intermediate space between the upper bending mold 14 and the lower bending frame 9–12. The window section 3 is then caused to rest on the transport frame 20 by cutting off the flow of hot gas, and if necessary also by blowing air from openings in the surface of the upper bending mold, and is transferred on the bending frame from the bending chamber into the tempering station.

The horizontal displacement of the bending frame segments 9–12 may be accomplished by the structure shown in detail in FIGS. 3 to 5. The bending frame segments 9–12 have a planar lower sliding surfaces and are provided at their ends with guide pins 26 that project outward, by which they rest on a planar support plate 27. The support plate 27 has a central opening 82 which corresponds in shape and in size to the surface defined inside the closed bending frame segments. The bending frame segments also have outwardly extending guide arms 28–31 at their respective middle sections. The guide arms 28–30 are respectively engaged with welded levers 32–34, which in turn are articulated to rail 40 through the intermediary of rods 36–38. The guide arm 31 of the bending frame segment 12 is attached to rail 40 directly by rod 39. The guide arms 28 to 31 are each mounted in a sliding manner between guide rollers 42. A servomotor 44 displaces the bending frame segments between the open and closed positions, via the intermediary of rods and levers as described, by operating on rail 40.

As FIG. 5 shows, the bending frame segments 9–12 are provided, at their ends by which they are joined, with centering elements comprised of a tongue and groove system 46 and 47. One can guarantee in this way that in the closed state the bending surfaces at the ends of the bending frame segments will smoothly merge with one another without forming a ledge.

Figure 6:
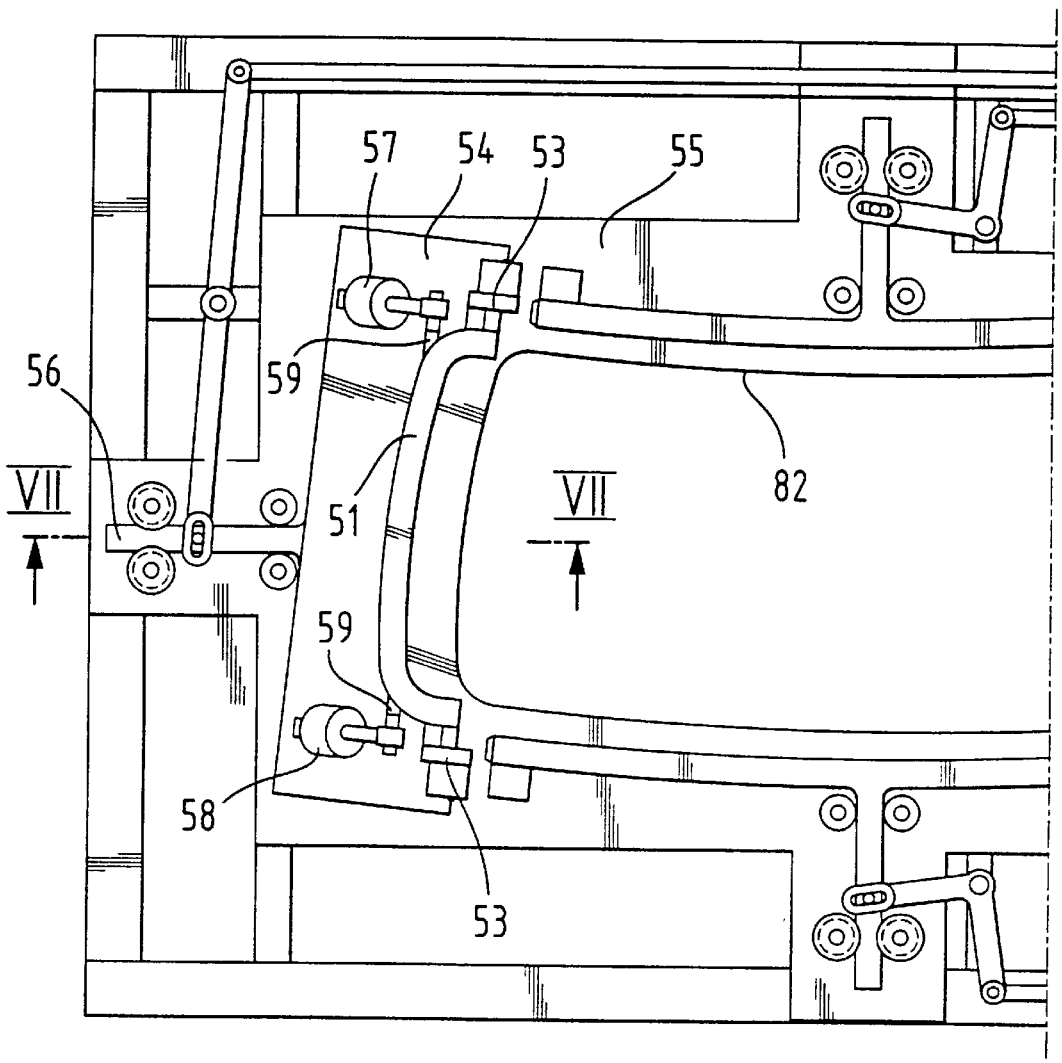
FIG. 6 shows a lower bending mold with horizontal displacement segments, and pivoting installation of the lateral segments of the bending mold.
Figure 7:
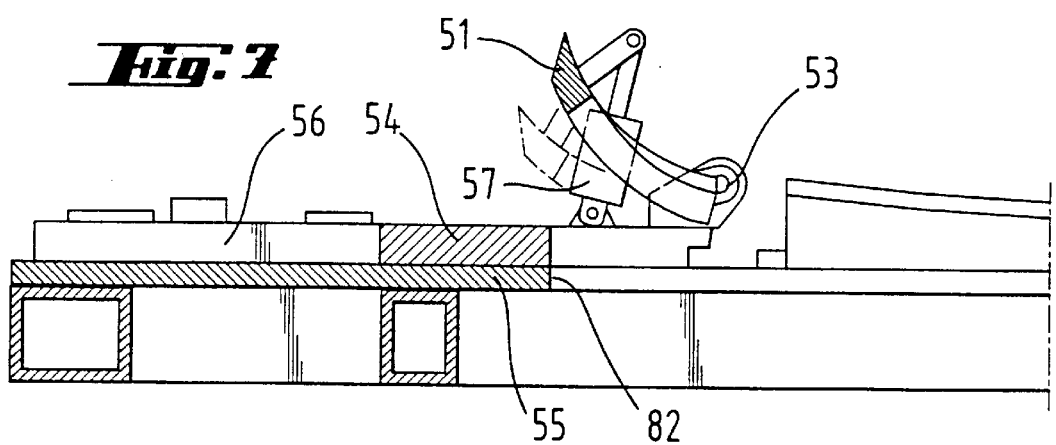
FIG. 7 is a sectional view along line VII—VII of FIG. 6.

In a variant of the segmented bending frame shown in FIGS. 6 and 7, a segmented bending frame has lateral segments 51 which can, in addition to horizontal sliding, pivot upward. Such lateral pivoting parts are required when the window sections are particularly strongly bent at the corresponding end zones.

For this purpose, the lateral bending frame segments, of which only the left bending frame segment 51 is shown, are each mounted via pivoting bearings 53 on a plate 54 which can be horizontally slid on a support plate 55 by a guide arm 56 operated by a lever construction corresponding to that in the previously described embodiment. Suitable actuators are arranged on plate 54 to bring the pivoting segment 51 into two end positions. For the sake of simplicity, these actuators are shown here as jacks 57, 58 arranged inside the bending chamber and whose piston rods are attached to arms 59 that are connected to the pivoting segment 51. In practice, the actuator jacks are always arranged outside the heated bending chamber and transmission of the piston strokes to the pivoting segment 51 is done via a suitable rod and lever system.

In operation, the four segments of the bending frame of this embodiment are first brought toward one another in a lowered position of the pivoting segment 51, and the upper convex bending mold is lowered onto this bending frame. Next, the pivoting segments 51 are elevated (pivoted about a horizontal axis) by operation of the actuators 57 and 58, by virtue of which the lateral end zones of the window section are bent into their final shape.

Figure 8:
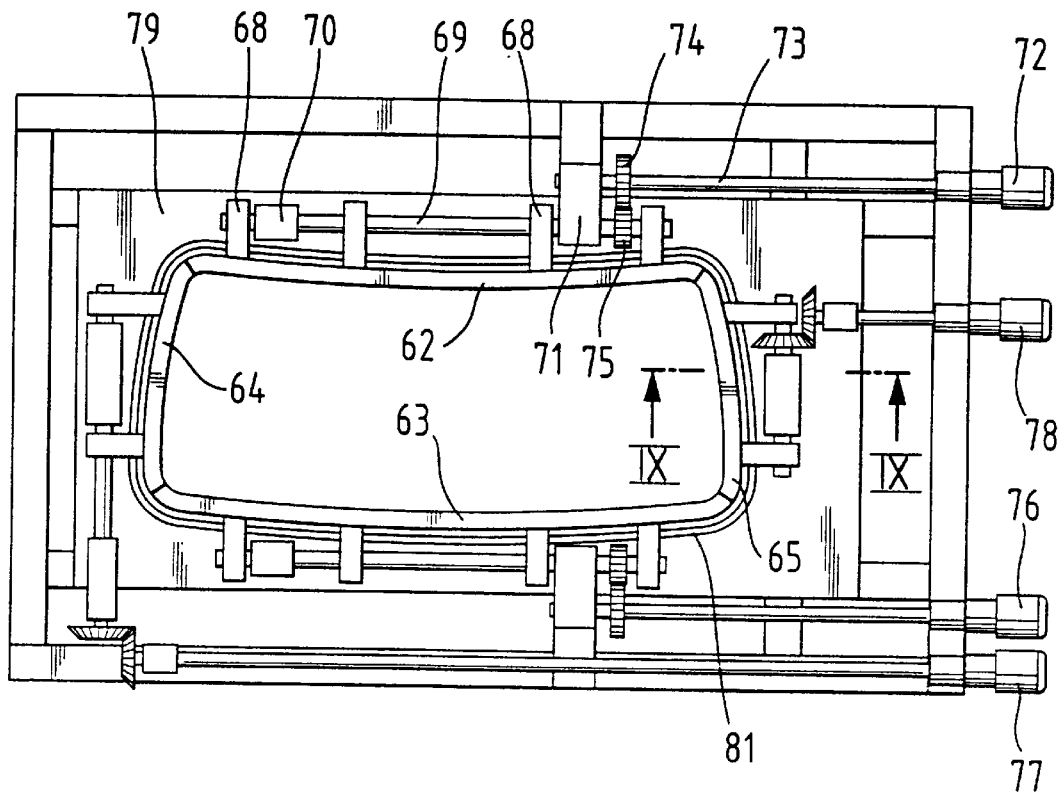
FIG. 8 illustrates one form of implementation of the lower bending mold segmented with pivoting installation of the segments of the bending mold.
Figure 9:
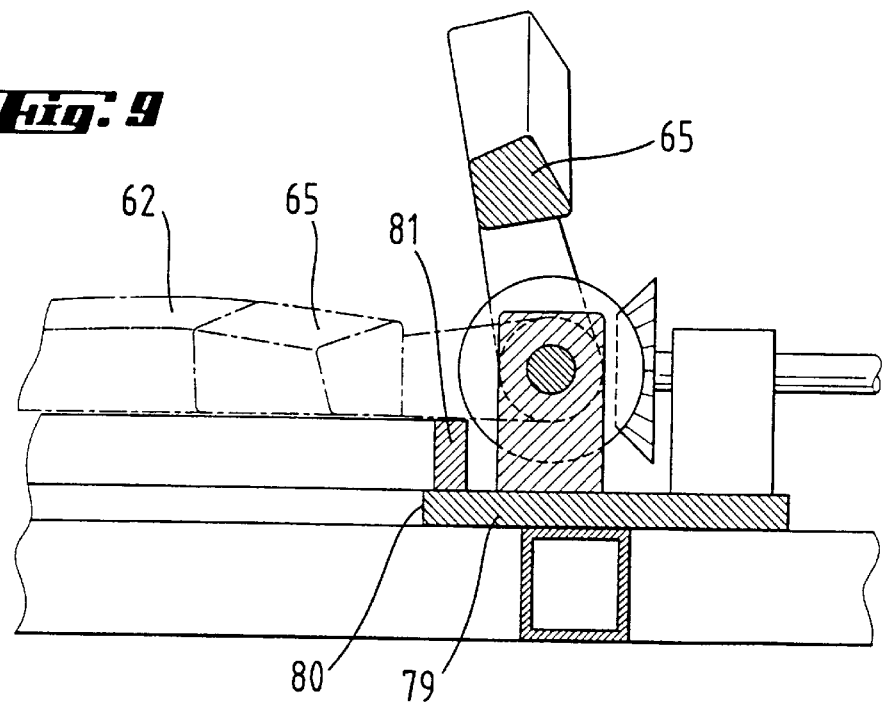
FIG. 9 is a sectional view along line IX—IX of FIG. 8.

Another embodiment of the device in conformity with the invention is shown in FIGS. 8 and 9. The bending frame is, in this case, comprised of four bending frame segments 62–65 which, in order to free the space between the upper bending mold and the transport plate of the window sections, are respectively pivotally mounted around a horizontal axis. For this purpose, the bending frame segment 62 is connected rigidly, through the intermediary of attachment 68, to a shaft 69 rotatably mounted in bearings 70 and 71. By use of servomotor 72, the segment 62 is pivoted upward into a desired position via shaft 73 and toothed wheels 74 and 75. In a similar manner, segment 63 is pivot by servomotor 76, segment 64 by servomotor 77 and segment 65 by servomotor 78.

Bearings 70 and 71 and the corresponding bearings for the shafts of the other bending frame segments are arranged on a support plate 79. The support plate 79 again has an opening 80 of great length for passage of the window section. Along this opening 80 there are arranged support lugs 81 which correspond to the contour of the bending frame segments and on which the bending frame segments are supported in their work position.

Obviously, numerous modifications and variations of the present invention are possible in light of the above teachings. It is therefore to be understood that the invention may be practiced otherwise than as specifically described herein.

We claim:

1. A device for bending glass sections, comprising:
   a bending chamber;
   a transport device which transports glass sections into the bending chamber;
   an upper bending mold located in the bending chamber above the level of a glass section transported by said transport device;
   a gas duct providing a gas pressure capable of raising a glass section from the transport device and holding the glass section against the upper bending mold;
   a lower bending frame positionable so as to press a glass section held against the upper bending mold by the gas pressure, wherein said lower bending frame is comprised of at least two segments; and
   a displacement device connected to said segments so as to displace each of said segments between a closed position defining said lower bending frame and an open position, wherein said segments are separated from one another by such a distance that said upper bending mold can pass through a space defined within the separated segments.

2. The device according to claim 1, wherein the displacement device includes a support plate on which said segments horizontally slide during the displacement.

3. The device according to claim 2, wherein said displacement device further comprises a common servomotor and a link system which connects said common servomotor to all of said segments to provide the displacement.

4. The device according to claim 3, wherein at least one of said segments is further mounted so as to be pivotally displaced about a horizontal axis.

5. The device according to claim 1, wherein the displacement of each of said segments is a pivoting displacement about a horizontal axis, and wherein said displacement device comprises a servomotor and a transmission for each of said segments.

6. The device according to claim 5 wherein said segments are pivotally mounted via pivoting bearings installed on a support plate provided with a passage opening for the glass section and the upper bending mold, and wherein the support plate includes support lugs positioned along the opening such that said segments rest on the lugs when said segments are in the closed position.

7. The device according to claim 1, wherein said segments include centering elements which cooperate to ensure that said segments will smoothly merge with one another in the closed position.

8. The device according to claim 1, wherein said glass section is quadrangular and said lower bending frame comprises four of said segments.

9. The device according to claim 1 further comprising a transport frame shaped to correspond to the bent glass section, the transport frame being positionable between said upper bending mold and said transport device for accepting the bent glass section.

10. A device for bending glass sections, comprising:
    a bending chamber;
    a transport device which transports glass sections into the bending chamber;
    an upper bending mold located in the bending chamber above the level of a glass section transported by said transport device;
    means for providing a gas pressure capable of raising a glass section from the transport device and holding the glass section against the upper bending mold;
    a lower bending frame positionable so as to press a glass section held against the upper bending mold by the gas pressure, wherein said lower bending frame is comprised of at least two segments;
    a transport frame shaped to correspond to the bent glass section, the transport frame being positionable between said upper bending mold and said transport device for accepting a bent glass segment;
    means for relatively vertically moving at least one of said upper bending mold and said lower bending frame such that said upper bending mold is positioned below said lower bending frame; and
    displacement means connected to said segments so as to displace each of said segments between a closed position defining said lower bending frame and an open position, wherein said segments are separated from one another by such a distance that said upper bending mold can pass through a space defined within the separated segments.

11. The device according to claim 10, wherein said segments include centering elements which cooperate to ensure that said segments will smoothly merge with one another in the closed position.

12. The device according to claim 10, wherein said glass section is quadrangular and said lower bending frame comprises four of said segments.

* * * * *